US009689489B2

(12) United States Patent
Baek et al.

(10) Patent No.: US 9,689,489 B2
(45) Date of Patent: Jun. 27, 2017

(54) APPARATUS AND METHOD FOR MOVING SHIFT LEVER OF VEHICLE

(71) Applicant: SL Corporation, Daegu (KR)

(72) Inventors: Nam Sik Baek, Gyeongsangbuk-do (KR); Deuk Kwon Kim, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 201 days.

(21) Appl. No.: 14/575,784

(22) Filed: Dec. 18, 2014

(65) Prior Publication Data
US 2015/0176704 A1 Jun. 25, 2015

(30) Foreign Application Priority Data

Dec. 19, 2013 (KR) .................. 10-2013-0159552

(51) Int. Cl.
F16H 59/10 (2006.01)
F16H 59/02 (2006.01)
F16H 61/12 (2010.01)

(52) U.S. Cl.
CPC ......... *F16H 59/0204* (2013.01); *F16H 59/10* (2013.01); *F16H 61/12* (2013.01); *Y10T 74/2003* (2015.01)

(58) Field of Classification Search
CPC ............ F16H 59/0204; F16H 59/0291; F16H 2061/1216; F16H 2061/1248; F16H 2061/168; F16H 2061/248
USPC ..................................................... 74/473.12
See application file for complete search history.

(56) References Cited

U.S. PATENT DOCUMENTS

| 5,899,829 | A  | * | 5/1999 | Salecker | B60W 10/02 |
| | | | | | 477/78 |
| 6,336,373 | B1 | * | 1/2002 | Murai | F16H 59/105 |
| | | | | | 192/220.4 |
| 6,550,351 | B1 | * | 4/2003 | O'Reilly | F16H 59/105 |
| | | | | | 74/335 |
| 7,107,869 | B2 | * | 9/2006 | Amamiya | F16H 63/3466 |
| | | | | | 74/335 |
| 7,241,244 | B2 | * | 7/2007 | Wang | F16H 61/32 |
| | | | | | 188/1.12 |
| 7,354,372 | B2 | * | 4/2008 | Wang | F16H 61/32 |
| | | | | | 188/1.12 |
| 7,712,392 | B2 | * | 5/2010 | Molkow | F16H 59/0204 |
| | | | | | 74/473.21 |
| 8,336,418 | B2 | * | 12/2012 | Giefer | F16H 59/0204 |
| | | | | | 74/473.23 |

(Continued)

FOREIGN PATENT DOCUMENTS

| DE | 102007036340 A1 * | 2/2009 | ......... F16H 59/0204 |
| DE | 102013007233 A1 * | 10/2014 | ......... F16H 59/0204 |

(Continued)

*Primary Examiner* — David M Fenstermacher
(74) *Attorney, Agent, or Firm* — Mintz Levin Cohn Ferris Glovsky and Popeo, P.C.; Kongsik Kim; Carolina Säve

(57) ABSTRACT

An apparatus for moving a shift lever includes an actuator to move the shift lever to a predetermined shift stage by applying a pressure to one side of the shift lever through a pressing member, a position detection unit to detect a position of the pressing member, and a control unit to drive a driving unit, which provides, if a stoppage of the pressing member is detected based on the detection result of the position detection unit, a driving force to the pressing member so as to eliminate the stoppage.

11 Claims, 6 Drawing Sheets

(56) References Cited

U.S. PATENT DOCUMENTS

| | | | | |
|---|---|---|---|---|
| 9,239,108 B2* | 1/2016 | Ganter | ............... | F16H 61/12 |
| 9,416,875 B2* | 8/2016 | Kim | ............... | F16H 59/02 |
| 2006/0053930 A1* | 3/2006 | Morita | ............... | F16H 59/10 |
| | | | | 74/473.18 |
| 2010/0071506 A1* | 3/2010 | Kliemannel | ........ | F16H 59/0204 |
| | | | | 74/625 |
| 2010/0263475 A1* | 10/2010 | Giefer | ............... | F16H 59/044 |
| | | | | 74/519 |
| 2010/0275714 A1* | 11/2010 | Mourad | ............... | F16H 63/18 |
| | | | | 74/473.11 |
| 2010/0307276 A1* | 12/2010 | Giefer | ............... | F16H 59/10 |
| | | | | 74/473.3 |
| 2012/0137812 A1* | 6/2012 | Woo | ............... | F16H 61/32 |
| | | | | 74/473.12 |
| 2014/0033849 A1* | 2/2014 | Yamamoto | ......... | F16H 59/0217 |
| | | | | 74/473.12 |
| 2014/0216885 A1* | 8/2014 | Heuver | ............... | B60T 1/005 |
| | | | | 192/219.4 |
| 2014/0352476 A1* | 12/2014 | Kim | ............... | F16H 59/02 |
| | | | | 74/473.21 |
| 2015/0369358 A1* | 12/2015 | Lee | ............... | F16H 59/08 |
| | | | | 74/507 |
| 2016/0273651 A1* | 9/2016 | Kim | ............... | F16H 59/0278 |
| 2016/0319929 A1* | 11/2016 | Kim | ............... | F16H 59/0204 |

FOREIGN PATENT DOCUMENTS

| | | | |
|---|---|---|---|
| JP | 11094073 | A | 4/1999 |
| JP | H1195998 | A | 4/1999 |
| JP | 2004257294 | A | 9/2004 |
| JP | 2005170247 | A | 6/2005 |
| KR | 20060007169 | A | 1/2006 |

* cited by examiner

APPARATUS AND METHOD FOR MOVING SHIFT LEVER OF VEHICLE

CROSS-REFERENCE TO RELATED APPLICATION

This application claims priority to Korean Patent Application No. 10-2013-0159552 filed on Dec. 19, 2013, which is herein incorporated by reference.

BACKGROUND

1. Technical Field

The present invention relates to an apparatus and a method of moving a shift lever.

2. Description of the Related Art

An automotive transmission system may change a gear ratio in order to constantly maintain the rotation of an engine depending on the speed of a vehicle. A driver may operate a shift lever provided in a transmission in order to change a gear ratio of the transmission.

As shift modes of the automotive transmission system, there are a manual shift mode in which the driver can manually change a shift stage, and an automatic shift mode in which the shift stage is automatically changed according to the speed of a vehicle.

In addition, a sports mode transmission system capable of performing a manual shift operation and an automatic shift operation in a transmission system has been used. In the sports mode transmission system, basically, while performing the automatic shift operation, the gear position may be changed by the driver to perform the manual shift operation, or an automatic transmission may be provided next to a manual transmission.

The automotive transmission system includes a shift lever such that the driver can change a shift mode or shift stage. Conventionally, the shift lever directly transmits an operation force applied by the driver to the transmission through a mechanical mechanism to change a shift mode or shift stage. However, recently, in order to eliminate inconvenience that occurs because the driver has to directly apply a certain amount of force required for changing a shift stage, there has been used an electronic transmission system in which the shift lever is operated in a predetermined direction by a displacement amount with only little operational force to change a shift mode or shift stage.

The electronic transmission system performs the shift control by using an electrically operated actuator, an electronic shift lever and the like instead of a mechanical connection structure of the transmission and the shift lever. In the electronic transmission system, operation feeling of the shift lever is excellent, and it is possible to reduce abrasion or noise by achieving a shift operation through a simple configuration.

The electronic transmission system has a function of automatically moving the shift lever to N stage or D stage in order to prevent confusion from occurring when the driver drives the vehicle again later if a predetermined moving condition (e.g., driver turns off the ignition while M stage is selected) is satisfied.

The movement of the shift lever may be performed by applying a pressure to one side of the shift lever through an actuator or the like when the vehicle is turned off. If the actuator is stopped during or after the movement of the shift lever due to abrasion or corrosion of the components included in the actuator, the normal movement of the shift lever or the selection of the shift stage may be hindered.

Accordingly, there is need for a method of preventing a stoppage that may occur when moving the shift lever.

SUMMARY

The present invention provides an apparatus and a method of moving a shift lever, which can eliminate a stoppage by temporarily driving an actuator at a maximum output when occurrence of the stoppage is detected in the actuator moving the shift lever.

According to an aspect of the present invention, there is provided an apparatus for moving a shift lever, comprising: an actuator to move the shift lever to a predetermined shift stage by applying a pressure to one side of the shift lever through a pressing member; a position detection unit to detect a position of the pressing member; and a control unit to drive a driving unit, which provides, if a stoppage of the pressing member is detected based on the detection result of the position detection unit, a driving force to the pressing member to eliminate the stoppage.

According to another aspect of the present invention, there is provided a method of moving a shift lever, comprising: determining whether a stoppage has occurred in a pressing member of an actuator which moves the shift lever to a predetermined shift stage by applying a pressure to one side of the shift lever; shutting off power of the actuator temporarily if it is determined that the stoppage has occurred in the pressing member; and driving a driving unit, which provides a driving force to the pressing member, at a maximum output.

The apparatuses and methods of moving a shift lever according to embodiments of the present invention provide many advantages. For example, in a case where the stoppage occurs in the actuator while the shift lever is moved through the actuator, the stoppage can be eliminated by temporarily driving the actuator at the maximum output. Accordingly, there is an effect of preventing a vehicle accident that may be generated when the shift lever is moved abnormally.

However, aspects and advantages of the present invention are not limited the ones set forth above. The above and other aspects and advantages of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
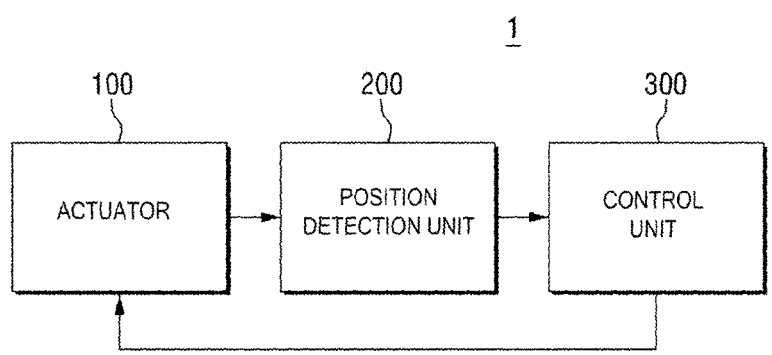
FIG. 1 is a schematic view of an apparatus of moving a shift lever according to an embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation. Throughout the specification, like reference numerals in the drawings denote like elements.

Figure 2:
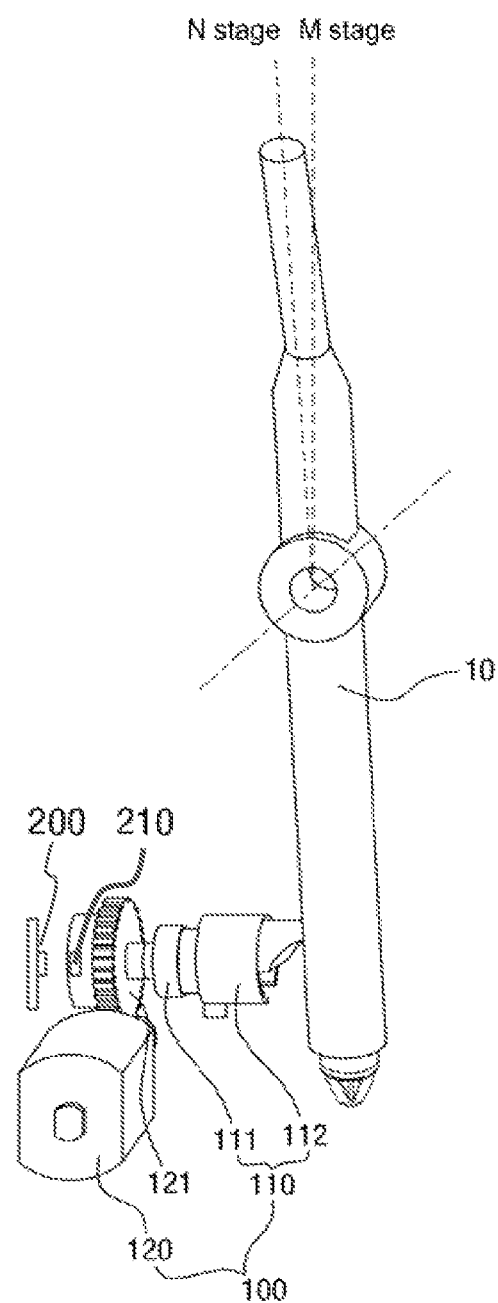
FIG. 2 is a perspective view of an actuator of the apparatus of FIG. 1.
Figure 3:
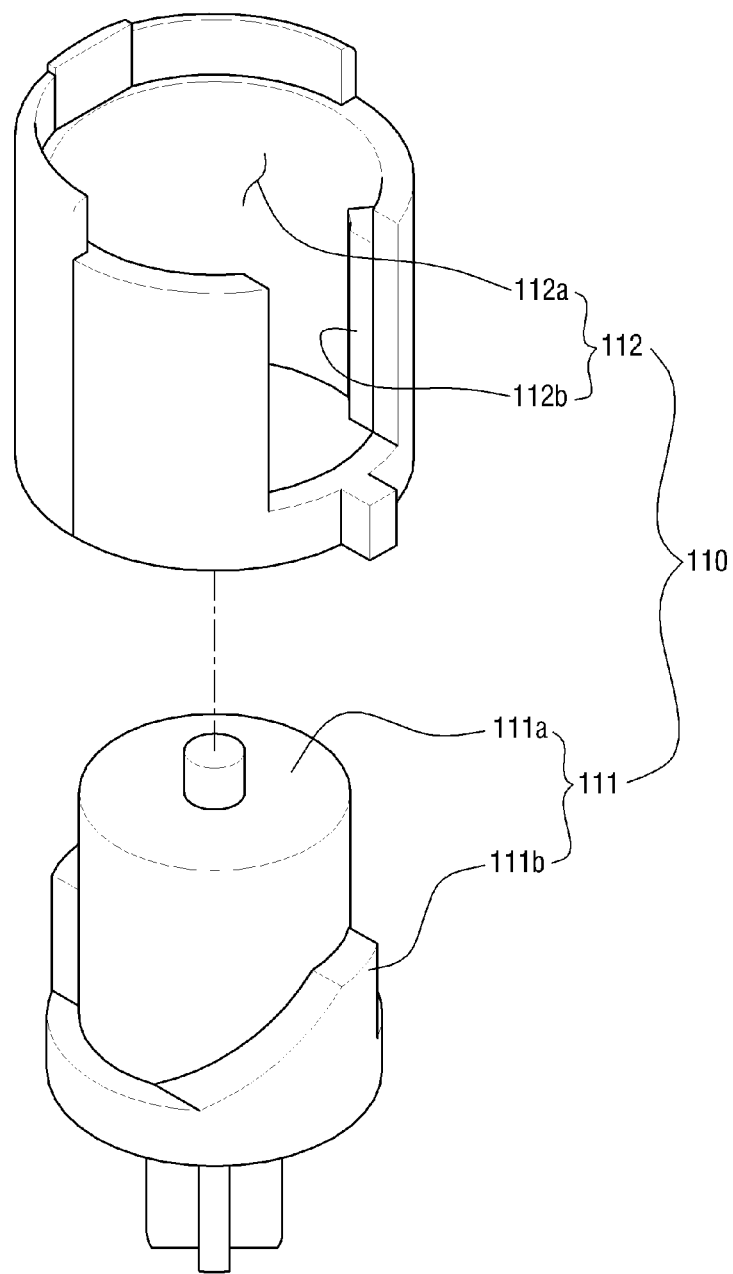
FIG. 3 is a perspective view of a pressing member of the apparatus of FIG. 1.
Figure 4:
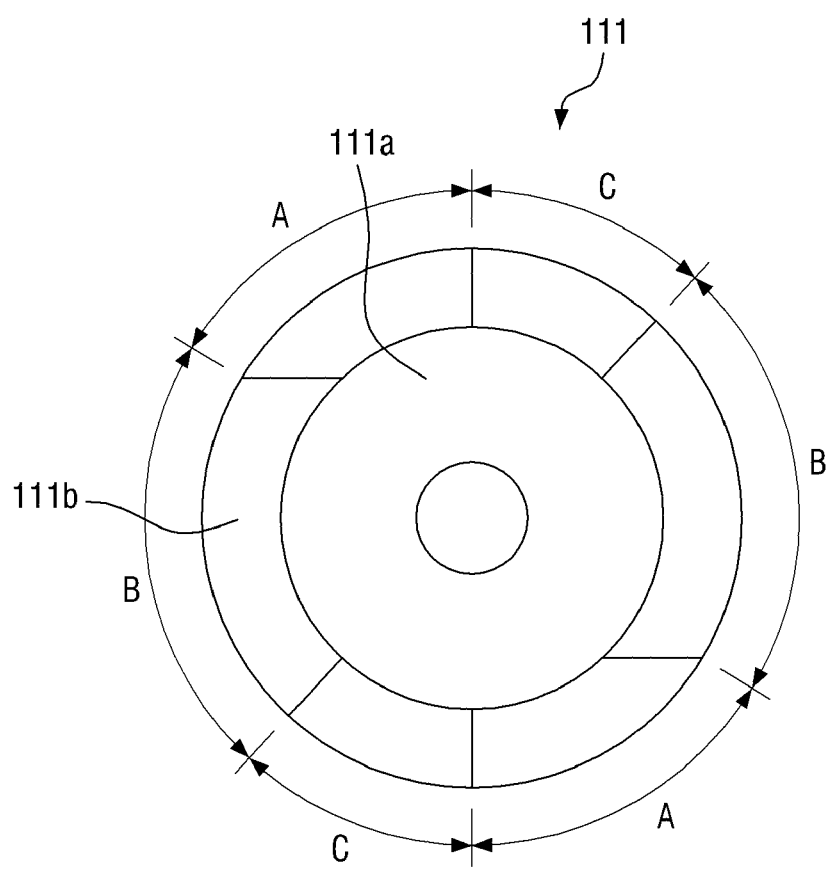
FIG. 4 is a plan view of a rotary member of the apparatus of FIG. 1.

An embodiment of the present invention provides an apparatus for moving a shift lever. FIG. 1 is a schematic diagram showing the apparatus, FIG. 2 is a perspective view of an actuator of the apparatus, FIG. 3 is a perspective view of a pressing member of the actuator, and FIG. 4 is a plan view of a rotary member of the apparatus.

As illustrated, an apparatus 1 for moving a shift lever includes an actuator 100, a position detection unit 200, and a control unit 300. The actuator 100 may be located on one side of a shift lever 10 as shown in FIG. 2, and serve to move the shift lever 10 to a predetermined shift stage by applying a pressure on one side of the shift lever 10. In the embodiment of the present invention, a case where the shift lever 10 is moved to a predetermined shift stage when a predetermined condition is satisfied in an electronic transmission system to which an electronic shift lever is applied will be described by way of example.

For example, in the transmission system capable of performing an automatic shift operation and a manual shift operation, the actuator 100 moves the shift lever 10 to a predetermined shift stage (e.g., N stage or D stage) even if a driver turns off the ignition of a vehicle while M stage is selected. Accordingly, it is possible to prevent confusion from occurring when the driver drives the vehicle again later.

In the embodiment of the present invention, the condition for moving the shift lever 10 is that the ignition is turned off while the M stage is selected. A case where the shift stage to which the shift lever 10 is moved by the actuator 100 is, e.g., the N stage will be described by way of example, but the invention is not limited thereto. The condition for moving the shift lever 10 may be variously changed according to the shift stage, and the shift stage to which the shift lever 10 is moved may be changed in various ways.

The actuator 100 applies a pressure to one side of the shift lever 10 through a pressing member 110 which is driven by a driving unit 120 such as a motor when the shift lever 10 is moved, but removes the pressure applied to the shift lever 10 after the shift lever 10 is moved. When the pressure applied to the shift lever 10 is removed, while moving the shift lever 10, the pressing member 110 is movable to the previous position.

In the embodiment of the present invention, the pressing member 110 of the actuator 100 may include, as shown in FIG. 3, a rotary member 111 which is rotated by the driving unit 120, and a moving member 112 which is moved in one direction by the rotary member 111 to apply a pressure to one side of the shift lever 10.

The rotary member 111 may be connected directly to a rotation shaft of the driving unit 120 or connected indirectly to the rotation shaft of the driving unit 120 by a driving gear 121. The rotational speed, the rotational direction, or the like of the rotary member 111 may vary according to the driving force provided by the driving unit 120.

In the moving member 112, a hollow 112a may be formed such that one side of the rotary member 111 is inserted and located in the hollow 112a. On the inner surface of the hollow 112a, at least one guide protrusion 112b may be formed.

The guide protrusion 112b may be located in a guide portion 111b formed along the outer circumference of a rotatable body 111a of the rotary member 111 to allow the moving member 112 to move in one direction according to the rotation of the body 111a.

That is, the guide portion 111b is formed to have a height that is variable in the rotation direction of the body 111a. As one example, the guide portion 111b may include, as shown in FIG. 4, a first section A having a first height which is the lowest in the moving direction of the moving member 112 from the bottom of the rotary member 111, a second section C having a second height higher than the first height, and a slope section B between the first section A and the second section C.

Thus, the moving member 112 may be most distant from the shift lever 10 when the guide protrusion 112b is located in the first section A of the guide portion 111b. In a state where the moving member 112 is moved to apply a pressure to one side of the shift lever 10, since the guide protrusion 112b and the guide portion 111b are separated from each other, the moving member 112 is movable to the previous position, i.e., the position in the first section A of the guide portion 111b, by the movement of the shift lever 10.

Further, when the guide protrusion 112b of the moving member 112 is located in the second section C, the moving member 112 is in a state of applying a pressure to one side of the shift lever 10. When the guide protrusion 112b is located in the slope section B, the moving member 112 is in a state of being gradually moved toward the shift lever 10.

As a non-limiting example, two or more of the guide portion 111b may be formed in the rotation direction of the body 111a. In the embodiment of the present invention, a case where two guide portions are formed along the circumference of the body 111a of the rotary member 111 as shown in FIG. 4 will be described by way of example.

The pressing member 110 moves the shift lever 10 by rotating the rotary member 111 such that the guide protrusion 112b of the moving member 112 is located in the second section C from the first section A of any one of a plurality of guide portions 111b, and then, the guide protrusion 112b is located in the first section A of the adjacent guide portion 111b. Thus, the moving member 112 is movable to the previous position when moving the shift lever 10.

For example, if the ignition of the vehicle is turned off while the M stage is selected, the shift lever 10 is moved to the N stage. In this case, by rotating the rotary member 111, the shift lever 10 is moved such that the guide protrusion 112b of the moving member 112 is located in the second section C from the first section A of any one of the guide portions 111b, and then the guide protrusion 112b is located in the first section A of the adjacent guide portion 111b. Accordingly, when the M stage is selected again later, the moving member 112 is movable to the previous position.

Meanwhile, in the embodiment described above, a case where the pressing member 110 moves the shift lever 10 through the moving member 112 which moves linearly in one direction will be described by way of example, but the present invention is not limited thereto. The moving member 112 may be configured to perform curved movement as well as linear movement. If the moving member 112 performs curved movement, a structure in which the rotary member 111 transfers a rotational force to the moving member 112 may be changed.

In this case, due to abrasion or corrosion of the components included in the actuator 100, for example, the moving member 112 may be caught in the rotary member 111. That is, the rotary member 111 fails to normally rotate, and a stoppage of the rotary member 111 may occur during the rotation. In this case, since the moving member 112 cannot normally apply a pressure to one side of the shift lever 10, it may be impossible to normally move the shift lever 10. In addition, when the shift lever 10 is moved for the selection of the M stage, a problem may occur.

For example, due to abrasion in the slope section B of the guide portion 111b, when the guide protrusion 112b of the moving member 112 is caught in rotary member 111, the moving member 112 fails to normally move, and thus, the rotary member 111 may be stopped.

In this case, if the moving member 112 has not been moved normally, it indicates that the rotary member 111 has not been rotated by a preset rotational angle. Accordingly, the control unit 300 detects the rotational angle of the rotary member 111 via the position detection unit 200, and continues to supply power until the rotary member 111 is rotated by the preset rotational angle. Consequently, unnecessary power consumption may occur.

Accordingly, in the embodiment of the present invention, the position of the pressing member 110 may be detected by the position detection unit 200. According to the detection result, if the stoppage of the pressing member 110 is detected, the control unit 300 may perform an operation to eliminate the stoppage. Hereinafter, in the embodiment of the present invention, a case where the position detection unit 200 detects the rotational angle of the rotary member 111 in order to detect the position of the pressing member 110 will be described by way of example.

The position detection unit 200 may detect the rotational angle of the rotary member 111, and may detect whether the rotary member 111 has been rotated by a preset rotational angle when moving the shift lever.

For example, the position detection unit 200 may include a sensor for sensing a change in magnetic force by a magnet 210 mounted on the driving gear 121 and output a detection signal corresponding to the change in magnetic force.

In the embodiment of the present invention, a case where the position detection unit 200 is a 2D sensor for sensing a change in magnetic force by a magnet 210 is described as an example, but the present invention is not limited thereto, and various types of sensors may be used.

The control unit 300 determines the rotational angle of the rotary member 111 based on the detection signal outputted from the position detection unit 200, and determines whether the stoppage has occurred in the rotary member 111.

Figure 5:
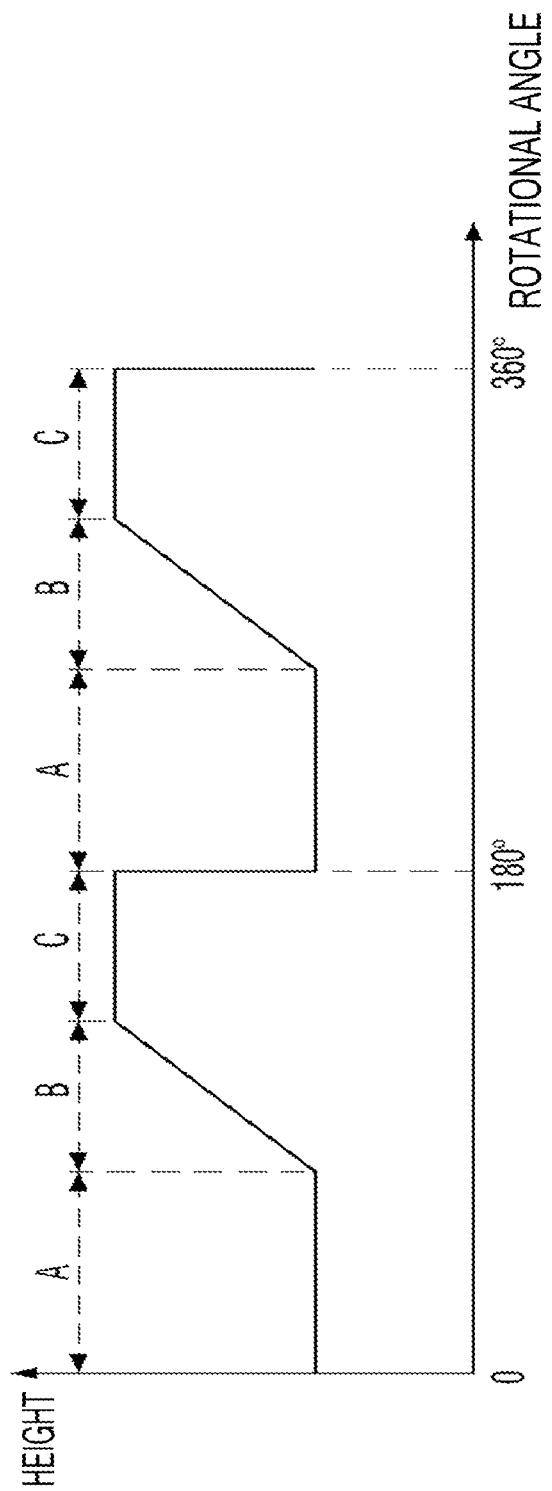
FIG. 5 is a graph showing a position according to a rotational angle of the rotary member of the apparatus of FIG. 1.

For example, as shown in FIG. 5, if two guide portions 111b are formed consecutively in the body 111a of the rotary member 111, the position detection unit 200 may output the detection signal corresponding to each of the sections A, B and C of each of the guide portions 111b. The control unit 300 may determine whether the stoppage has occurred in the rotary member 111 based on the output detection signal.

Accordingly, if the movement of the shift lever is normally made, the rotary member 111 should be rotated such that the guide protrusion 112b of the moving member 112 is located from the first section A of any one of a plurality of the guide portions 111b into the first section A of the adjacent guide portion 111b. However, if it is determined that the rotary member 111 is stopped for more than a certain period of time between the first sections A of the guide portions 111b based on the detection result of the position detection unit 200, the control unit 300 may determine that the stoppage has occurred.

As described above, if it is determined that the stoppage has occurred in the rotary member 111, the control unit 300 may perform an operation to eliminate the stoppage.

For example, if the rotary member 111 is maintained in a stopped state for a certain period of time, the control unit 300 may shut off the power supplied to the actuator 100, and then eliminate the stoppage by driving the driving unit 120 which provides the driving force to the rotary member 111 at the maximum output to relatively increase the rotational force of the rotary member 111.

Since the driving unit 120 rotates the rotary member 111 normally at an appropriate output in a predetermined range rather than the maximum output, the stoppage can be eliminated by driving the driving unit 120 at the maximum output to temporarily greatly increase the rotational force of the rotary member 111.

In the embodiment of the present invention, a case where the control unit 300 shuts off the power supplied to the actuator 100 and rotates the rotary member 111 at the maximum output is described as an example. However, the present invention is not limited thereto, and the control unit 300 may eliminate the stoppage by rotating the rotary member 111 by a predetermined angle in a reverse direction, and rotating the rotary member 111 at the maximum output to increase the acceleration of the rotary member 111.

In other words, assuming that a direction in which the rotary member 111 is rotated normally is referred to as a forward direction, when the stoppage has occurred due to abrasion or corrosion of the components included in the actuator 100, the rotary member 111 is rotated by a predetermined angle in the reverse direction. Then, as described above, by rotating the rotary member 111 at the maximum output to accelerate the rotary member 111, the stoppage of the rotary member 111 can be eliminated more easily.

As described above, rotating the rotary member 111 at the maximum output by the control unit 300 may be repeated the preset number of times. Whenever the rotation is repeated, by continuously detecting the position of the rotary member 111, it is possible to determine whether the stoppage has been eliminated.

Meanwhile, even after an operation is performed to eliminate the stoppage of the rotary member 111 as described above, if the stoppage of the rotary member 111 is still detected, the control unit 300 may output a warning message or warning sound via a sound device or a display device in the vehicle, or transmit it to a portable terminal of the driver through a wireless communication or the like, thereby allowing the driver to take swift action before driving the vehicle.

Figure 6:
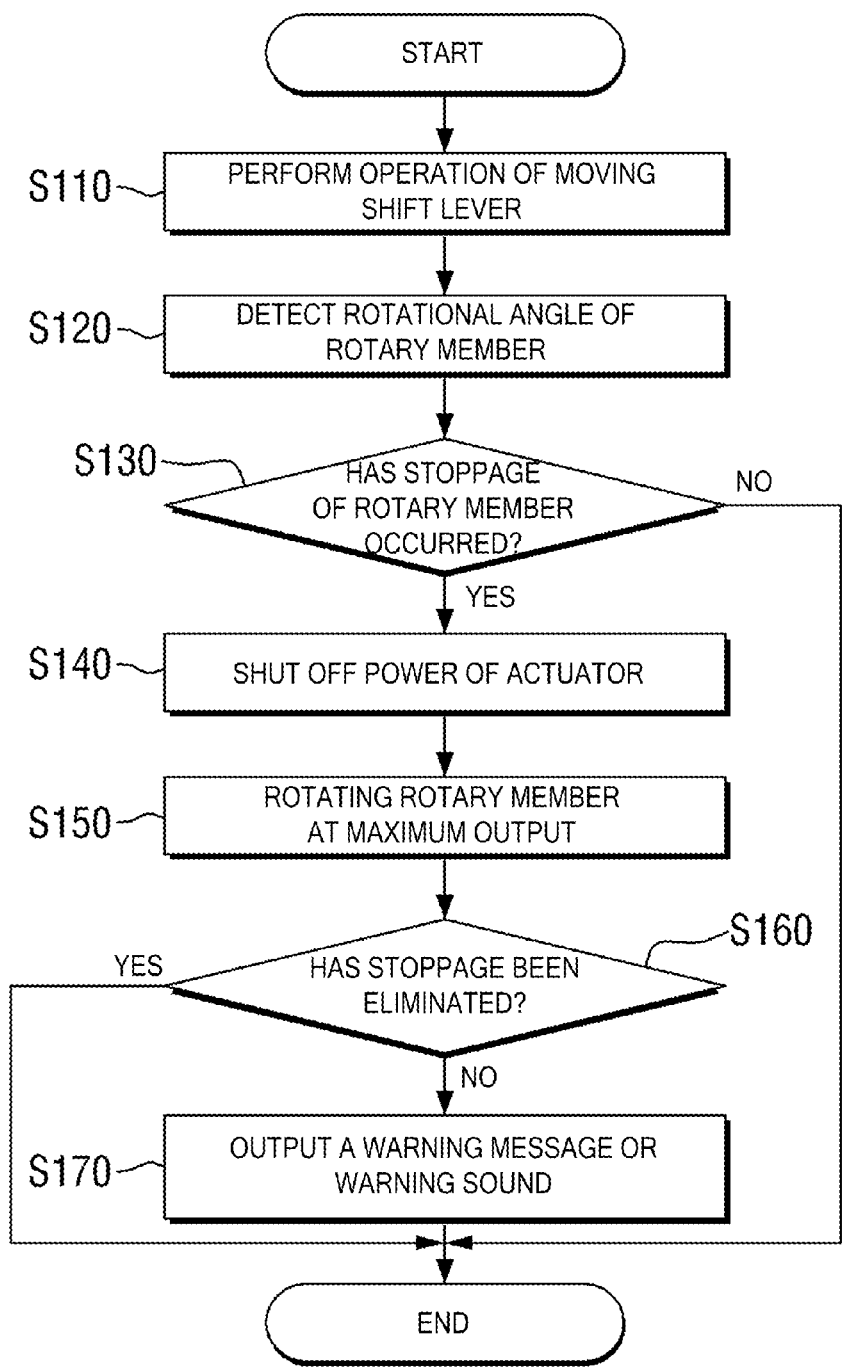
FIG. 6 is a flowchart showing a method for moving a shift lever according to another embodiment of the present invention.

Another embodiment of the present invention provides a method for moving a shift lever. FIG. 6 is a flowchart showing the method in which when the driver turns off the ignition while selecting the M stage, the shift lever is moved to the N stage.

As illustrated, in the moving method of the shift lever according to the embodiment of the present invention, first, if the condition for moving the shift lever 10 is satisfied, the actuator 100 is driven to perform an operation of moving the shift lever 10 (step S110).

After the operation of moving the shift lever 10 is performed, the position detection unit 200 detects the rotational angle of the rotary member 111 (step S120).

The control unit 300 determines whether the stoppage of the rotary member 111 has occurred based on the detection result of the position detection unit 200 (step S130).

For example, the control unit 300 may determine that the stoppage has occurred in the rotary member 111 if a state where the rotational angle of the rotary member 111 is not located in the first section A of FIG. 5 is continued for more than a predetermined time according to the detection result of the position detection unit 200.

If it is determined that the stoppage has occurred in the rotary member 111, the control unit 300 temporarily shuts off the power supplied to the actuator 100 (step S140), and then, drives the driving unit 120 at the maximum output to rotate the rotary member 111 (step S150).

For example, assuming that the driving unit 120 has a maximum output when a voltage of 12 V is applied, the control unit 300 normally applies an appropriate voltage (e.g., 5 V) to the driving unit 120. On the other hand, as described above, when the stoppage occurs, the control unit 300 greatly increases the rotational force of the rotary member 111 temporarily by applying a voltage of 12 V to eliminate the stoppage.

After rotating the rotary member 111 at the maximum output, the control unit 300 may determine whether the rotary member 111 is in the stopped state based on the detection result of the position detection unit 200 (step S160), and repeatedly perform the above-described steps S140 to S160 the preset number of times if the stopped state is still maintained.

Then, if the stoppage is not eliminated, the control unit 300 may transmit a warning message or warning sound to the driver such that swift action is taken (step S170).

As described above, in the shift lever moving apparatus 1 according to the embodiment of the present invention, if the stoppage occurs in the actuator 100 for moving the shift lever 10, i.e., if the moving member 112 is caught in the rotary member 111, it is possible to prevent a vehicle accident or injury to persons in advance by performing an operation to eliminate the stoppage by itself.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An apparatus for moving a shift lever, comprising:
an actuator moving the shift lever to a predetermined shift stage by applying a pressure to one side of the shift lever through a pressing member;
a position detection unit detecting a position of the pressing member; and
a control unit driving a driving unit, which provides, if a stoppage of the pressing member is detected based on the detection result of the position detection unit, a driving force to the pressing member to eliminate the stoppage of the pressing member occurring in the actuator moving the shift lever,
wherein the pressing member includes a rotary member and a cam, and
wherein the cam performs curved movement and linear movement.

2. The apparatus of claim 1, wherein the rotary member is rotated by the driving force of the driving unit, and the cam is moved in one direction by the rotation of the rotary member, and
wherein the position detection unit detects a rotational angle of the rotary member.

3. The apparatus of claim 2, wherein in the rotary member, a plurality of guide portions, each having a plurality of sections with different heights in a moving direction of the cam, are formed along a circumference of a rotatable body, and the cam includes a guide protrusion movable by rotation of the guide portions to make a moving distance variable.

4. The apparatus of claim 3, wherein each of the guide portions includes a first section having a first height, a second section having a second height higher than the first height, and a slope section between the first section and the second section, and
wherein the rotary member is rotated such that, when moving the shift lever, the guide protrusion is initially located from the first section of any one of the plurality of guide portions and moved into the first section of another adjacent guide portion.

5. The apparatus of claim 2, wherein the stoppage is a state where the cam is caught in the rotary member.

6. The apparatus of claim 1, wherein the control unit temporarily shuts off power supplied to the actuator before driving the driving unit at a maximum output.

7. The apparatus of claim 1, wherein the control unit drives the pressing member in a reverse direction before driving the driving unit at a maximum output.

8. A method for moving a shift lever, comprising:
determining whether a stoppage has occurred of a pressing member in an actuator which moves the shift lever to a predetermined shift stage by applying a pressure to one side of the shift lever;
shutting off power of the actuator temporarily if the stoppage of the pressing member has occurred; and
driving a driving unit to provide a driving force to the pressing member to eliminate the stoppage if it is determined that the stoppage of the pressing member has occurred in the actuator moving the shift lever,
wherein the pressing member includes a rotary member and a cam, and
wherein the cam performs curved movement and linear movement.

9. The moving method of claim 8, wherein the determining comprises:
   detecting a rotational angle of the rotary member in the pressing member which is rotated by the driving unit and the cam which is moved in one direction by the rotary member; and
   determining whether the detected rotational angle is a preset rotational angle.

10. The moving method of claim 8, wherein the driving comprises driving the pressing member in a reverse direction before driving the driving unit at a maximum output.

11. The moving method of claim 8, further comprising, after the driving,
   determining whether the stoppage has been eliminated; and
outputting a warning message or warning sound if the stoppage has not been eliminated.

* * * * *